United States Patent [19]

Herr et al.

[11] Patent Number: 4,712,768
[45] Date of Patent: Dec. 15, 1987

[54] QUARTER TURN VALVE

[75] Inventors: Leroy E. Herr; Allan K. Shea, both of Erie; Timothy E. Kunkle, McKean, all of Pa.

[73] Assignee: White Consolidated Industries, Inc., Cleveland, Ohio

[21] Appl. No.: 922,782

[22] Filed: Oct. 23, 1986

Related U.S. Application Data

[63] Continuation of Ser. No. 747,980, Jun. 24, 1985, abandoned.

[51] Int. Cl.$^4$ ............................................. F16K 1/22
[52] U.S. Cl. ..................................... 251/305; 251/173; 251/192; 251/306
[58] Field of Search ............... 251/305, 306, 173, 175, 251/192, 359; 137/625.31, 625.3; 277/27

[56] References Cited

U.S. PATENT DOCUMENTS

| | | | |
|---|---|---|---|
| 965,322 | 7/1910 | Peterson | 137/625.28 |
| 1,131,371 | 3/1915 | Hatfield | 251/115 |
| 1,167,145 | 1/1916 | Baverey | 137/625.31 |
| 1,302,891 | 5/1919 | Balthasar | 251/305 |
| 2,882,010 | 4/1959 | Bryant | 251/306 |
| 3,298,677 | 1/1967 | Anderson | 251/305 |
| 3,677,297 | 7/1972 | Walton | 251/305 |
| 3,960,177 | 6/1976 | Baumann | 251/305 |
| 4,296,915 | 10/1981 | Baumann | 251/306 |
| 4,407,483 | 10/1983 | Gachot | 251/306 |

FOREIGN PATENT DOCUMENTS 420756 3/1967 Switzerland.

Primary Examiner—A. Michael Chambers
Assistant Examiner—John C. Fox
Attorney, Agent, or Firm—Schweitzer & Cornman

[57] ABSTRACT

The disclosure is directed to a high performance butterfly control valve which may be applied and utilized in critical high pressure and/or high performance operation environments. In accordance with the invention, the vane of the butterfly valve is formed to include first and second diametrically opposed, asymmetrical projections, each extending from the periphery of the vane and each including a plurality of fluid control passages formed therethrough. The projection adjacent the downstream rotated periphery of the vane is formed to a generally smooth, streamlined configuration to minimize the overall volume of the vane, and to facilitate a smooth, turbulence free flow when the valve is in the full open position. Moreover, the projection adjacent the upstream rotated periphery of the vane is formed to a length of extension which is greater than the length of extension of the diametrically opposed projection. The asymmetrical projections and fluid control passages provide low angle flow control with an overall vane configuration that affords a practical maximum full open valve fluid flow.

7 Claims, 6 Drawing Figures

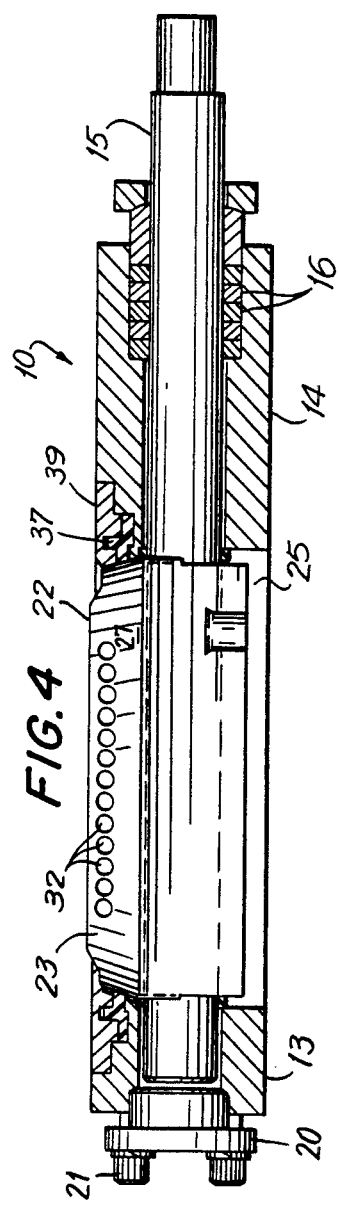
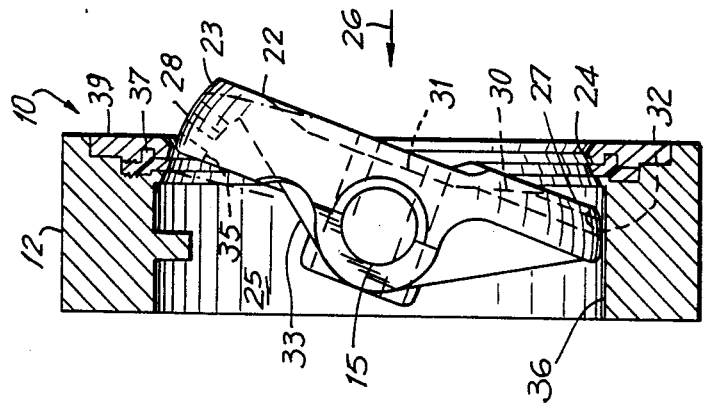
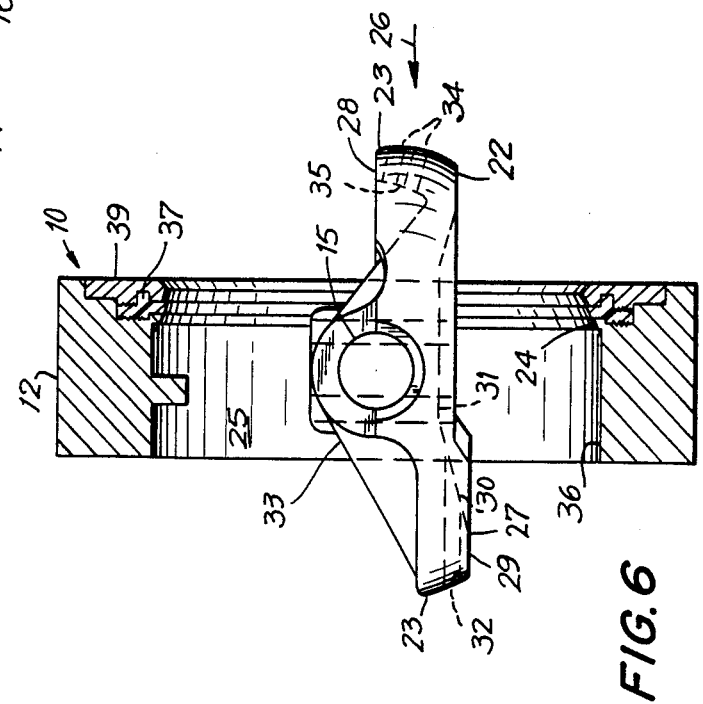

QUARTER TURN VALVE

BACKGROUND AND SUMMARY OF THE INVENTION

This is a continuation of application Ser. No. 747,980, filed June 24, 1985, now abandoned.

The present invention is directed to a butterfly valve and, more particularly, to a new and improved high pressure, high performance butterfly control valve.

Typically, a butterfly valve comprises a vane in the form of a disc with a part spherical periphery. The disc is rotatably mounted within the fluid path of a valve housing, whereby the vane periphery may be rotated to engage the internal surfaces of the housing to shut the valve. In order to open the valve, the vane is rotated by a shaft about an axis such that the periphery thereof is displaced from the housing surfaces to permit fluid flow around the periphery. The initial fluid flow during the beginning of rotation of the vane is in the form of two new-moon-shaped flows, one around the downstream-rotated periphery of the vane and the other around the upstream-rotated periphery of the vane.

A characteristic of each new-moon-shaped fluid flow is that a small angular change in the vane position due to rotation results in a relatively large change in flow area. Accordingly, it is rather difficult to accurately control the characteristics of fluid flow particularly during the low angle region of vane rotation. While the lack of fluid control is not significant for many low pressure butterfly valve applications, it is critical in any high pressure and/or high performance fluid control utilization. For this reason, conventional butterfly valve designs have generally not been considered for use in high pressure and critical, high performance environments.

An example of one prior art proposal to improve fluid flow control during low angle rotation of a butterfly valve vane is found in U.S. Pat. No. 3,677,297. Pursuant to the disclosure of the '297 patent, a pair of recesses is formed in the vane to define two symmetrical, diametrically opposed semi-circular projections, one extending in the upstream rotation direction and the other extending in the downstream rotation direction. A plurality of fluid control flow passages is provided in each of the projections with each control passage extending from the outer periphery of the vane to the complementary recess. In the operation of the valve, the vane is rotated as in a conventional butterfly valve design. However, prior to the displacement of the vane periphery from the housing surfaces, the fluid control flow passages of the projections are exposed to fluid flow. Accordingly, all of the initial fluid flow through the butterfly valve during a first predetermined number of degrees of rotation of the vale is entirely through some or all of the plurality of fluid control flow passages. After rotation through the first predetermined number of degrees, the outer edges of the projections formed at the periphery will clear the valve housing surfaces and further fluid flow characteristics will be as in wide angle operation of a conventional butterfly design.

it is a primary objective of the present invention to provide a new and improved high performance butterfly valve suitable for use in critical, high performance and/or high pressure applications. Generally, the invention comprises a novel vane configuration including a downstream offset shaft and asymmetrical upstream and downstream projections to maximize full open valve fluid flow with excellent fluid control during low angle operation. The offset shaft facilitates a highly efficient leak tight seal between the vane periphery and the internal walls of the valve body. When the shaft is downstream from the vane, the torque developed by the shaft increases at a uniform rate during valve opening to provide a more stagble valve control. Moreover, the offset orientation of the shaft co-operates with the downstream extending projection to provide a minimal obstruction to fluid flow when the vane is in the full open position, as will appear.

In accordance with an important feature of the invention, the vane is formed to include two, diametrically opposed, generally semi-circular projections, one extending in the upstream direction and the other extending in the downstream direction of fluid flow. The two projections are asymmetrical with respect to one another and are each provided with a plurality of fluid flow passages. The fluid flow passages are each arranged to extend from the outer periphery of the vane to the inner diameter of the complementary projection. In this manner, the initial fluid flow through the valve during a first predetermined number of degrees of rotation of the vane will be solely through the passages. Such an arrangement facilitates maximum fluid flow control during low angle operation with significantly reduced valve noise and cavitation.

Pursuant to a critical teaching of the invention, the asymmetrical projections are arranged whereby the upstream extending projection is formed to a streamline configuration with a smooth, generally flat upstream most surface (when the vane is in the fully closed position) and the downstream extending projection is greater in length of extension relative of the upstream extending projection. During operation of the valve, the vane is rotated such that the upstream extending projection is rotated in the downstream direction and vice versa. Accordingly, as the vane periphery is rotated relative to the inner valve body wall, the fluid passages of the downstream extending projection will be exposed to fluid flow prior to the displacement of the vane periphery from the wall, with fluid flow being from the vane periphery opening of each passage to the projection inner diameter opening of each passage. Conversely, prior to the displacement of the vane periphery from the wall, the fluid passages of the upstream extending projection will be exposed to fluid flow with fluid flow being from the inner diameter opening of each flow passage to the peripheral opening of each passage.

Due to the greater relative length of extension of the downstream extending projection, a greater number of fluid flow passages may be formed therethrough. For example, two circumferentially spaced rows of passages may be formed at the part spherical periphery of the upstream rotated, part-spherical portion of the vane. Accordingly, all fluid flow may be channeled through the passages of the downstream extending projection for a sufficient total predetermined range of angular rotation of the vane to provide significant low angle fluid flow control. At the opposite end of valve operation, i.e., when the vane is in the full open position, the downstream extending projection is recessed somewhat below the downstream offset shaft to provide a minimal streamline obstruction to fluid flow, thereby maximizing the full open rate of fluid flow.

On the opposite side of the vane, the upstream extending projection is rotated in the downstream direction and fluid flow through the passages of the upstream extending projection, prior to displacement of the vane periphery from the valve housing wall, results in fluid egress from the peripheral openings of the passages. As will appear in the following detailed description of a preferred embodiment of the invention, the vane periphery and the peripheral openings of the upstream extending projection are arranged to be in close proximity to the inner surfaces of the valve housing wall during low angle rotation of the vane. It has been discovered that a close proximity between the vane periphery and the valve housing wall surfaces, together with the peripheral egress of fluid inherently contributes to the control of low angle fluid flow through the downstream rotated portion of the vane. Consequently, the upstream extending projection is formed to a streamline configuration with a length of extension significantly less than the length of extension of the downstream extending projection, as discussed above. The downstream rotated periphery of the vane will be displaced from the valve housing wall well before the displacement of the upstream rotated periphery due to the streamline configuration of the complementary projection.

Thus, after the aforementioned first predetermined number of degrees of rotation, only the flow through the upstream rotated periphery will be solely through flow passages for a second predetermined number of degrees of rotation (i.e., until the upstream periphery is displaced from the valve housing wall). Nevertheless, the discovered contribution of flow control by the valve housing wall and close periphery results in significant low angle fluid flow control around the downstream rotated portion of the vane without the need of the relatively longer length of extension of the downstream extending projection or the extra fluid passages formed therethrough. The discovery is effectively utilized in the streamline configuration and flat surface of the upstream extending projection whereby, at the full open vane position, the streamline projection provides a minimal obstruction to fluid flow.

Accordingly, the novel vane structure taught by the present invention provides a significantly improved butterfly valve operation suitable for high pressure and high performance applications. The downstream offset shaft and asymmetrical projections afford reliable low angle fluid control while providing a vane configuration which is a minimal obstruction to fluid flow when in the full open position. The streamline, upstream extending projection utilizes fluid control passages to control fluid flow during the first predetermined number of degrees of vane rotation and, thereafter, additionally utilizes the flow control effects of the valve housing wall, close vane periphery and peripheral fluid egress to maintain adequate flow control during the second predetermined number of degrees of vane rotation. On the opposite side of the vane, the relatively longer length of extension and extra flow passages of the downstream extending projection provide adequate flow control during the entire first and second predetermined number of degrees of vane rotation. The overall configuration of the vane, including the streamline projection and advantageous offset geometry between the shaft and downstream extending projection, presents a generally streamline full open vane to fluid flow to maximize the total fluid flow capacity of the valve and minimize undesirable effects such as turbulence around the vane.

For a better understanding of the above, and other features and advantages of the invention, reference should be made to the following detailed description of a preferred embodiment of the invention and to the accompanying drawings.

BRIEF DESCRIPTION OF THE DRAWINGS

FIG. 3 is an additional side cross-sectional view of the valve as shown in FIG. 2 and illustrating the vane after rotation through a first predetermined number of degrees.

FIG. 4 is a bottom view, partially in cross-section, of the valve of FIG. 1, taken generally along line 4—4.

FIG. 6 is a further side cross-sectional view of the valve as shown in FIG. 2 and illustrating the vane after rotation through 90° (full open valve position).

DETAILED DESCRIPTION OF A PREFERRED EMBODIMENT

Figure 1:
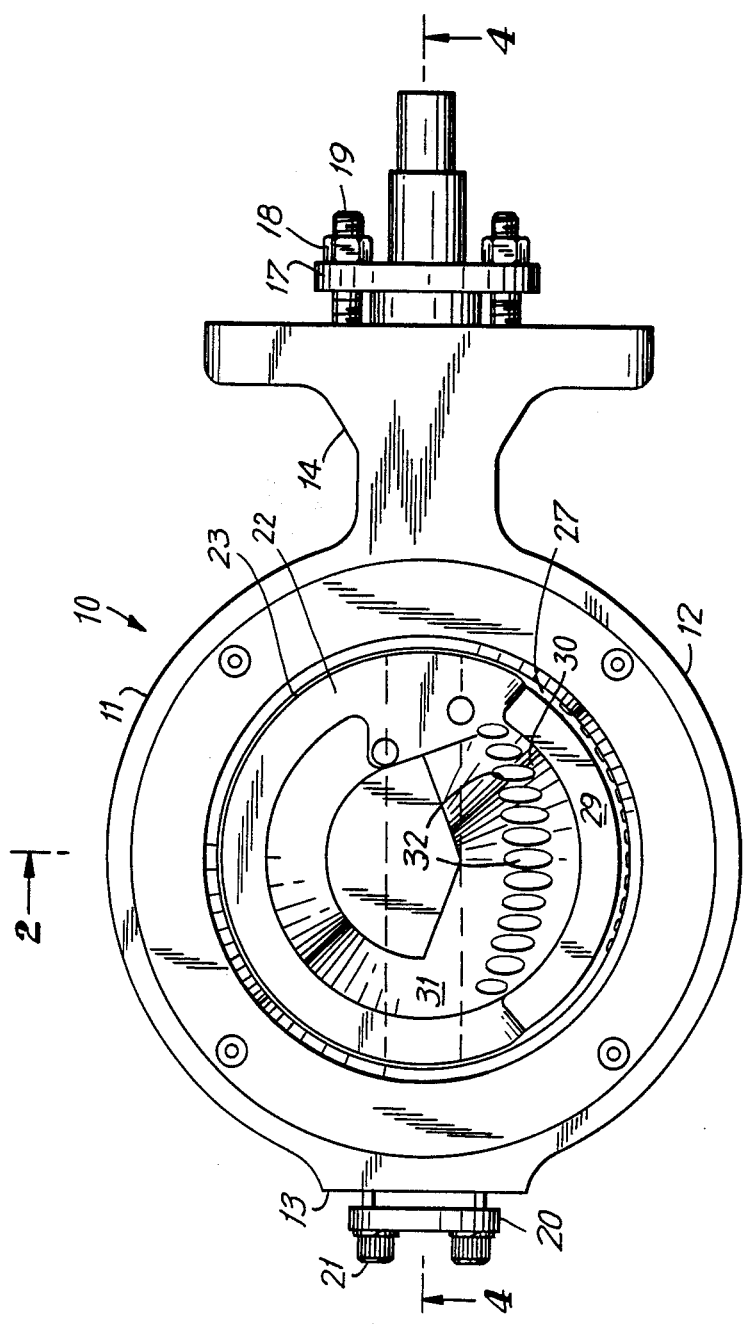
FIG. 1 is a front plan view of a high performance butterfly control valve built in accordance with the invention.

Referring to the drawings, and initially to FIG. 1, a butterfly valve is generally designed by the reference numeral 10. The valve includes a valve housing 11 which comprises a cylindrical valve body 12 and shaft support structures 13, 14 integral therewith to rotatably support a shaft 15. As illustrated in FIG. 4, the shaft 15 is supported at either end by the structures 13, 14 and is arranged to extend completely through the internal flow area 25 of the valve body 12. Moreover, the right end of the shaft 15 extends beyond the structure 14 for connection to an actuator whereby the shaft may be selectively controlled to rotate through a work stroke in either the clockwise or counterclockwise rotational directions, as is well known in the art (not specifically illustrated).

To advantage, a series of sealing rings 16 is mounted between the internal surfaces of the structure 14 and shaft 15 to prevent fluid leakage. The sealing rings 16 are secured and compressed within the structure 14 by an end cap 17 which is bolted to the structure 14 by a nut 18 and bolt 19 arrangement. An additional end cap member 20 is bolted to the open end of the shaft support structure 13 by suitable bolts 21 to close and seal off the valve housing 11.

Figure 2:
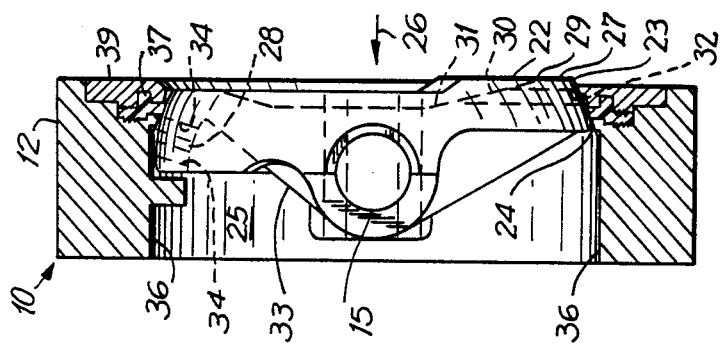
FIG. 2 is a side cross-sectional view of the valve of FIG. 1 taken generally along line 2—2 and illustrating the vane in the closed position.

In accordance with the invention, a novel circular vane structure 22 including a part spherical outer periphery 23 is fixedly secured upon the shaft 15 for rotation within the valve body 12. As illustrated in FIG. 2, the shaft 15 supports the vane 22 whereby the entire outer periphery 23 of the vane 22 is in a sealed relation with a portion of the inner cylindrical surface 24 of the valve body 12. In this position, the vane 22 completely obstructs the flow area 25 of the valve body 12 to close the valve 10. Pursuant to conventional butterfly valve operation, the actuator (not specifically illustrated) operates to rotate the shaft 15 whereby the periphery 23 of the vane 22 is displaced from the inner surface 24. The shaft 15 may rotate the vane up to a quarter turn or 90° of rotation.

At 90° of rotation, the diameter of the vane 22 perpendicular to the shaft 15 will extend generally parallel with the direction 26 of fluid flow (see FIG. 6). In this position, the valve 10 is in the full open position. However, it should be understood that although the valve 10 is now in the full open position, the vane 22 is still within the flow area 25 of the valve body 12 and, therefore, presents an obstruction to fluid flow. Such a vane obstruction is an inherent problem with respect to butterfly valve design and it is a principal teaching of the present invention to provide a vane configuration which minimizes the flow obstruction effects of the vane while accomplishing low angle rotation flow control, as will appear.

Pursuant to the invention, the vane 22 is mounted upon the shaft 15 whereby the shaft 15 is offset in the downstream direction from the peripheral portions 23 of the vane 22 (as seen in FIG. 2). Moreover, the vane 22 is formed to include asymmetrical upstream and downstream extending semi-circular projections 27, 28 each extending over diametrically opposed, approximately 180° portions of the vane 22. The upstream extending projection 27 is generally streamline in configuration including a flat, smooth upstream, most top surface 29 (as seen in FIG. 2) that gradually tapers down 30 to the upstream face 31 of the vane 22. As indicated by FIGS. 3 and 6, the upstream extending projection 27 is rotated in the downstream direction through 90° to the full open vane position, whereby the face 31, tapered surface 30 and flat smooth surface 29 of the projection 27 provide a smooth, streamline and turbulence free obstruction to fluid flow.

In accordance with the low angle rotation flow control features of the invention, as will be described in greater detail below, the upstream extending projection is provided with a series of fluid flow passages 32. Each of the flow passages 32 is arranged to extend generally parallel to the direction of fluid flow (as illustrated in FIG. 6) and includes an opening on the tapered surface 30 of the upstream extending projection 27 and a peripheral opening on the part spherical vane periphery 23. Of course, at full open position, (FIG. 6) the then parallel to flow passages 32 act to reduce the obstructing volume of the vane 22 and further minimize the obstruction effect of the vane 22 by accommodating fluid flow from the upstream oriented tapered surface opening of each passage 32 to the downstream oriented peripheral opening of each passage 32.

On the downstream face 33 of the vane 22 (see FIG. 2), the downstream extending projection 28 is formed to a length of extension that is relatively greater than the length of extension of the upstream extending projection 27 whereby two circumferentially spaced rows of flow passages 34 are formed for low angle flow control. Each of the flow passages 34 includes an opening on the part spherical periphery 23 of the vane 22 and an opening on the opposite surface 35 of the projection 28. Referring once again to FIG. 6, when the vane is in the full open position, the projection 28 will have been rotated in the upstream direction whereby the fluid flow around the face 33 of the vane 22 will first encounter the peripheral end of the projection 28. The two rows of flow passages 34 will act to reduce the obstructing volume of the projection 28 by accommodating fluid flow therethrough. In addition, according to a specific feature of the invention, the flow passages 34 are arranged to extend at a slight, upward angle relative to the direction of fluid flow 26 whereby the flow through the passages at full open position is guided upwardly to minimize turbulence around the offset shaft 15. The face 33 of the vane 22 is also tapered from either side of the shaft 15 to provide a more streamline, turbulence free flow around the shaft 15. Pursuant to a further feature of the invention, the projection 28 is offset below the shaft 15 when the vane 22 is in the full open position (see FIG. 6) as an additional means to minimize turbulence and facilitate smooth fluid flow across the face 33 of the vane 22 when in the full open position.

Thus, according to the vane configuration teaching of the invention, the full open obstruction and turbulence effects of the vane 22 are reduced to the lowest practicable limit while providing peripheral flow passages 32, 34 for significant low angle rotation fluid control. Referring now to FIG. 3, as the shaft 15 is operated to rotate the vane 22 in the clockwise opening direction, the periphery 23 is moved relative to the portion 24 of the valve body 12. Prior to displacement of the periphery 23 from a sealed relation with the portion 24, the flow passages 32, 34 of the projections 27, 28 will be gradually exposed to fluid flow. In the preferred embodiment of the invention, the vane 22 is rotated approximately 5°–6° before any of the flow passages 32, 34 are exposed to fluid flow. Approximately 5°–6° of rotation, all of the passages 32 and the first row of passages 34 will begin to be exposed to fluid flow approximately simultaneously. The entire fluid flow will be through the passages 32 and first flow of passages 34 from approximately 5°–6° of rotation, until approximately 11° of rotation. Moreover, the volume of fluid flow will gradually and controllably increase as the passages 32 and first row of passages 34 are gradually exposed to full fluid flow due to rotation of the vane 22. At approximately 11° of rotation, the periphery 23 about the projection 27 will just clear the portion 24 of the valve body 12 and the second row of passages 34 will begin to be exposed to fluid flow.

Thereafter, further rotation of the vane 22 will result in a further gradual and controlled increase in fluid flow due to the existing flow through the fully exposed passages 32 and first row of passages 34, the gradual exposure of the second row of passages 34 and the increasing flow around the displaced, downstream rotated periphery 23 about the projection 27. As discussed above, the periphery 23 adjacent the projection 27 is in close proximity (approximately 0.061") to the inner wall 36 of the valve housing 12. Moreover, the fluid flow through the passages 32 will exit the passages 32 at the peripheral openings thereof and flow toward the close inner wall 36. The close proximity between the wall 36 and periphery 23, together with the peripheral fluid egress from the passages 32 results in an inherent flow control whereby the inherent control about the projection 27 and the gradual fluid flow increase due to the gradual exposure of the second row of flow passages 34 to fluid flow provides further low angle flow control from approximately 11° of rotation to approximately 17° of rotation of the vane 22.

At approximately 17° of rotation, the periphery 23 about the projection 28 will clear the surface 24 and further fluid flow increase up to 90° of rotation of the vane 22 will be due to increased flow around both the upstream rotated and downstream rotated portions of the periphery 23 of the vane 22. However, at approximately 17° of rotation and beyond, there is sufficient linearity between degrees of rotation and flow increase to accommodate critical flow requirements.

Referring once again to FIG. 2, when the vane 22 is in the closed position, it it critical that a leak light seal be maintained between the periphery 23 and wall portion 24. To assure the integrity of the seal, an inventive annular seal element 37 is mounted circumferentially about the portion 24 of the valve wall 36 at the position where the vane periphery 23 is closest to the portion 24 to form the actual seal. The seal element 37 forms the subject matter of co-pending application Ser. No. 747,980, filed June 24, 1985, which is hereby expressly incorporated by reference. The seal element 37 is formed to a predetermined cross-section, as will be described in greater detail below, and is mounted between a recess 38 formed in the valve body 12 and an annular retaining element 39 which is secured to the valve body 12 by any well known suitable means such as threaded bolts (not shown). As clearly illustrated in the detailed drawing of FIG. 5, the retaining element 39 and recess 38 define a seal containment chamber which generally conforms to the predetermined cross-section of the seal element 37. The seal element itself may be described in terms of three integral portions I, II, III which are dimensioned relative to one another and to the chamber defined by the recess 38 and retaining element 39 to provide an effective seal against the vane periphery 23. At the same time, the predetermined cross-section of the seal element 37 will provide a leak-tight seal over a wide range of fluid pressures in a manner whereby the deleterious effects of the pressure are minimized thereby greatly increasing the work life of the seal.

Pursuant to the inventive concept embodied in the seal element 37, the fluid pressure will be retained by the seal element 37 through three clearly defined, discrete pressure range operating stages of the element 37. In the preferred embodiment, the seal element 37 comprises an EPT teflon material (without any ancillary spring members or glass filled internal membranes) with a surface 40 of the first portion I conforming to serrations 41, 42 formed in the retaining element 39 and recess 38, respectively whereby the element 37 is securely mounted within the containment chamber. The surface 40, and serrations 41, 42 also provide an effective seal against leakage to the outside of the valve body 12. The first portion I is integral with the second portion II which is arranged to extend, relative to the first and third portions, in the upstream fluid flow direction. The third portion III is integral with the lower end of the second portion II and extends downwardly into the flow area 25 for sealing contact with the periphery 23 of the vane 22. As should be understood, the lower end of the portion II is conformed to the part spherical contour of the periphery 23 to provide an effective seal between the element 37 and periphery 23 from point P1 to point P2. Moreover, the portion III extends into the flow area 25 by an amount sufficient to provide a radial squeeze on the periphery 23 to form a leak tight seal.

Figure 5:
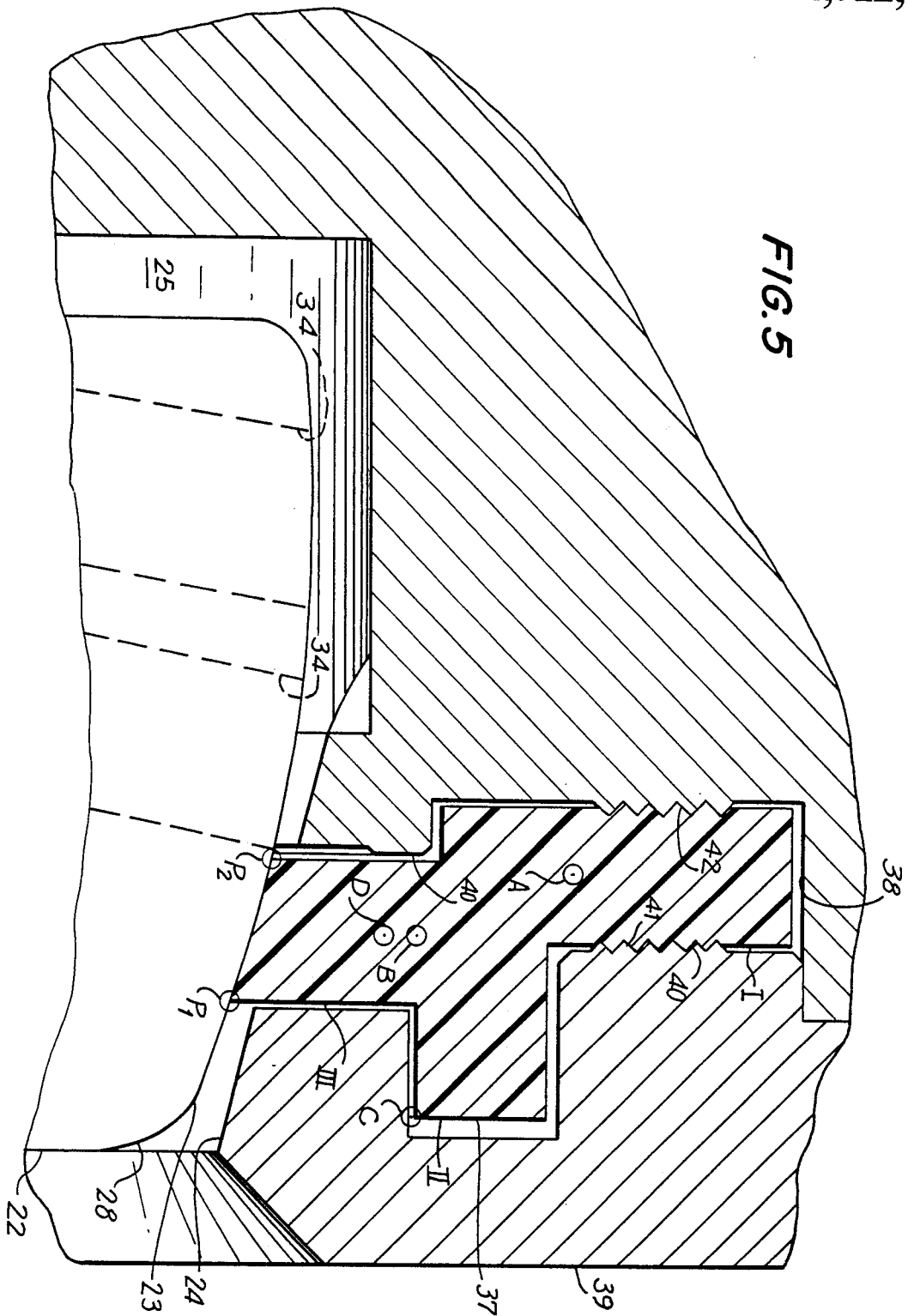
FIG. 5 is an exploded detail view of the vane seal element illustrated in FIG. 2.

As described above, and as illustrated in FIG. 5, the mating surface 40, and serrations 41, 42 rigidly support the seal element 37 from point A outward to the sealing surface between points P1 and P2. Point A is also initially a pivot point about which the sealing surface (P1-P2) may pivot and freely, effectively contact the vane periphery 23. The stage one operating mode contemplates the seal orientation as depicted in FIG. 5 during a fluid pressure range of from 0 PSIG to approximately 100 PSIG. The only contact points for the seal element 37 are at the mating surfaces 40, 41, 42 and with the vane periphery 23 between points P1 and P2. The seal element 37 is dimensioned such that the radial squeeze on the periphery 23 is sufficient to seal fluid under the low pressure conditions.

Stress and deflection on the seal 37 in the low pressure stage one operating mode may be approximated by applying the vertical deflection and unit stress at surface of plate formulas set forth on pages 173–174 of the Handbook of Formulas for Stress and Strain by William Griffel. (New York: Frederick Ungar Publishing Co., 1966, hereby expressly incorporated by reference). The constants used for the calculations according to the formulas as applied to the stage one mode of the seal element 37 are determined from loading case 6 of Table 1 (page 175) (circular plate with concentric hole—outer edge fixed and supported, uniform load over entire actual surface).

A prototype seal element according to the invention was constructed for use in connection with the 6 inch prototype valve discussed above. The prototype seal element was made from an EPT teflon material having a tensile strength of 4000 psi, a tensile modulus of elasticity equal to $10 \times 40^4$ and a tensile elongation equal to 400%. Moreover, the prototype seal element had a thickness of 0.156 inches, an inner diameter (to P1-P2) equal to 5.643 inches and an outer diameter (to fixed point A) equal to 6.388 inches. By applying the Griffel formulas according to Table 1 case 6 it was determined that with the above seal values and dimensions operated under a pressure of 100 psi, the maximum vertical deflection of the prototype seal is 0.0095" and the maximum stress at the outer edge of the seal is 1889 psi.

When the operating environment of the valve is changed to be within a pressure arrangement of between 100 psig and 500 psig, the fluid pressure will push the seal element 37 into contact with the support surface 40 at point B. Accordingly, the seal element 37 will no longer be unsupported from point A to points P1-P2, but will have some support from the support surface 40 applied at point B. The support introduced at point B will tend to inhibit increasing stresses at point A due to the higher fluid pressure environment. When the seal element 37 is in contact with the support surface 40 (i.e., a pressure range of from 100 psig to 500 psig), it will be in the stage two operating made contemplated by the inventive concept.

A reasonable approximation of the true working stresses on the seal element 37 during second mode operation may be found by taking an average of the calculated stresses from each of case 6 and case 13 (both edges fixed, balanced loading (piston)) of Table 1. Such an approximation considers point B to be part way between rigidly fixed and freely supported. The case 6 and case 13 calculations for the prototype seal (all valves and dimensions for the seal being the same as in the stage one with exception of the outer diameter which is now considered to be 6 inches (to point B) and formula constants according to case 6 and case 13 of Table 1)) operated at 500 psig indicate a case 6 maximum deflection of 0.0116 inches and a maximum stress at the outer edge of 942 psi and a case 13 maximum deflection of 0.0065 inches and maximum stres (at outer edge) of 1345 psi.

Thus, the higher pressure environment of the stage two operating mode causes the seal element 37 to naturally assume a different geometric orientation relative to the seal containment chamber defined by the recess 38 and retaining element 39 by pivoting into contact with the support surface 40. The reorientation of the seal element 37 and the additional part rigidly fixed, part freely supported seal retention introduced at point B advantageously changes the stress effects upon the seal element 37 by reducing the outer diameter dimension, from point A to point B, and by changing the Griffel case approximations from case 6 to an average of case 6 and case 13. Accordingly, the maximum stress upon the outer edge of the seal member is retained at a level below the stresses that would be introduced upon the seal element 37 had the reorientation not occurred.

The third operating mode of the seal element 37 occurs when the operating environment includes fluid pressures above 500 psig. At such higher pressure operation, the fluid pressure causes the seal element 37 to deflect further until the upstream extending portion II of the seal element 37 contacts the retaining element 39 at point C. In this orientation, the seal element 37 may be considered as being rigidly held at points P1 and P2 and at point D (see FIG. 5). Accordingly, the seal element 37 will now have an effective outer edge diameter (to point D) that is considerably smaller than the outer edge diameter of the stage one operating mode (to point A) resulting in a reduced stress effect upon the seal caused by the higher pressure environment. Moreover, the rigid support at point D as well as the continued retention applied to the seal at point B provides a stress distribution upon the seal as a pure case 13 situation (Table 1 of Griffel Handbook). In the prototype seal discussed above, the seal element 37 in the third operating mode will have an outer diameter, (to point D) of 5.925 inches (as opposed to 6.388 inches for stage one (to point A) and 6.0 inches for stage two (to point B) resulting in a case 13 maximum deflection of 0.006 inch and maximum stress of 1268 psi at 750 psig pressure operation.

Thus, in accordance with the invention embodied in the seal element 37, the three discrete pressure range modes of operation inherently and automatically orient the seal relative to the seal confinement chamber to move the seal retention point (outer diameter) inward toward the sealing surface defined by points P1 and P2. This results in the formation of a leak tight seal around the outer perimeter of the vane while confining the fluid pressure and stress effects upon the seal to within practical minimum ranges. The relatively low stress throughout the various pressure ranges of seal operation minimize seal wear and cold flow to achieve a long, effective seal work life. Significantly, the seal element 37 is operable without the need of glass filled internal membranes for dimensional stability or additional spring elements to impart a radical squeeze on the vane.

The prsent invention provides a quarter turn valve that is operable with a maximum full open flow rate with minimum turbulence and further affords a high degree of fluid control during low angle operation. Thus, the relatively low cost, simple construction and ease of operation inherent in butterfly valve design may now be applied and utilized in critical high performance environments. The assymetrical vane projections take full advantage of the discovered inherent low angle fluid control adjacent the downstream rotated portion of the vane to provide a high degree of fluid flow control while permitting a streamline vane configuration to minimize the obstruction effects of the vane during full open operation. Morever, the vane of the invention, when operated with the seal element of co-pending application Ser. No. 747,980, provides long term, leak tight valve shut off.

The above-described preferred embodiment of the invention is meant to be representative only, as certain changes may be made therein by persons skilled in the art without departing from the clear teachings of the invention. Accordingly, reference should be made to the following appended claims in determining the full scope of the invention.

We claim:
1. A high performance butterfly control valve, which comprises:
   (a) a valve housing,
   (b) a generally disc-shaped vane mounted for selective, controlled rotation in said valve housing,
   (c) said vane including a periphery and being formed to include first and second diametrically opposed, asymmetrical projections, each extending from the periphery of the vane;
   (d) said vane being rotatable through a quarter turn of rotation with the periphery of said vane being in a sealed relation with the valve housing at zero degrees of rotation and the vane extending generally parallel to the direction of fluid flow through the valve housing at 90° of rotation;
   (e) said first projection being formed about the portion of the vane periphery rotated in the downstream direction;
   (f) said first projection including a plurality of first fluid control passages formed therethrough each extending from the vane periphery portion of the projection to the opposite face of the projection, whereby fluid flow adjacent the downstream rotated portion of the vane periphery is solely through said first fluid control passages during a first predetermined number of degrees of vane rotation and fluid flow egress is from the peripheral portion of each passage;
   (g) said second projection being formed about the portion of the vane periphery rotated in the upstream direction;
   (h) said second projection including a plurality of second fluid control passages formed therethrough, each extending from the vane periphery portion of the projection to the opposite face of the projection whereby fluid flow adjacent the upstream rotated portion of the vane periphery is solely through said second fluid control passages during a second predetermined number of degrees of vane rotation;
   (i) said second predetermined number of degrees of vane rotation being greater than said first predetermined number of degrees of vane rotation;
   (j) said downstream rotated periphery and said first projection each being in close proximity to the valve housing at least during a third predetermined number of degrees of vane rotation, and;
   (k) said first projection having a length of extension that is less than the length of extension of said second projection and being formed to a generally streamline, smoothly contoured configuration.

2. The high performance butterfly control valve according to claim 1, further characterized by
   (a) the first fluid control passages extending along said first projection in a single row, and
   (b) the second fluid control passages being arranged in two circumferentially spaced rows, each extending along said second projection.

3. The high performance butterfly control valve according to claim 1, further characterized by (a) said disc-shaped vane being mounted upon a selectively rotatable shaft, and (b) said selectively rotatable shaft being offset from said disc-shaped vane in the downstream direction.

4. The high performance butterfly control valve according to claim 3, further characterized by the outermost end portion of said second projection being recessed below said selectively rotatable shaft when the disc-shaped vane is at 90° of rotation.

5. The high performance butterfly control valve according to claim 4, further characterized by each of said second fluid control passages being orientated relative to the direction of fluid flow when the vane is at 90° of rotation, whereby fluid flow through the second fluid control passages is directed over said selectively rotatable shaft.

6. A high performance butterfly control valve which comprises:

(a) a valve housing, (b) a generally disc-shaped vane, including an outer periphery, (c) said disc-shaped vane being mounted for selective controlled rotation in said valve housing, whereby a first portion of said outer periphery is rotated in the downstream direction, and a second portion of said outer periphery is rotated in the upstream direction, (d) said disc-shaped vane being rotated through a quarter turn of rotation, whereby the outer periphery is in a sealed relation with the valve housing at 0° of rotation, and the vane extends generally parallel to the direction of fluid flow through the valve housing at 90° of rotation, (e) a first projection extending from said vane about the first portion of the outer periphery, (f) said first projection including a first set of fluid control passages arranged whereby fluid flow adjacent the first portion of the outer periphery is solely through said first set of fluid control passages during a first predetermined number of degrees of vane rotation, (g) each one of said first set of fluid control passages including an opening for fluid flow egress arranged at the first portion of the outer periphery of the disc-shaped vane, (h) said first portion and said first projection each being in close proximity to the valve housing at least during a second predetermined number of degrees of vane rotation, (i) said first projection being formed to a generally streamlined smoothly contoured configuration, (j) a second projection extending from said vane about the second portion of the outer periphery, (k) said second projection including a second set of fluid control passages arranged whereby fluid flow adjacent the second portion of the outer periphery is solely through said second set of fluid control passages during a third predetermined number of degrees of vane rotation, (l) said second projection having a length of extension that is greater than the length of extension of said first projection, (m) said third predetermined number of degrees of vane rotation being greater than said first predetermined number of degrees of vane rotation.

7. A high performance butterfly control valve which comprises:

(a) a valve housing, (b) a generally disc-shaped vane, including an outer periphery, (c) said disc-shaped vane being mounted for selective controlled rotation in said valve housing, whereby a first portion of said outer periphery is rotated in the downstream direction, and a second portion of said outer periphery is rotated in the upstream direction, (d) said disc-shaped vane being rotated through a quarter turn of rotation, whereby the outer periphery is in a sealed relation with the valve housing at 0° of rotation, and the vane extends generally parallel to the direction of fluid flow through the valve housing at 90° of rotation, (and)

(e) a first projection extending from said vane about the first portion of the outer periphery, (f) said first portion and said first projection each being in close proximity to the valve housing at least during a predetermined number of degrees of vane rotation whereby said close proximity inherently controls fluid flow about said first projection and said first portion during said predetermined number of degrees of vane rotation, and (g) a second projection extending from said vane about the second portion of the outer periphery, (h) said first projection being formed to a generally streamlined, smoothly contoured configuration and to a length of extension which is minimized to the extent permitted by the inherent control of said close proximity, (i) said first projection having a length of extension which is less than the length of extension of said second projection, thereby providing a minimal, turbulence free obstruction to fluid flow when said vane is at 90° of rotation.

* * * * *